(12) United States Patent
Levy

(10) Patent No.: US 8,078,412 B2
(45) Date of Patent: Dec. 13, 2011

(54) METHOD TO DETERMINE CONNECTOR LEAKS DURING TESTING

(75) Inventor: David Levy, Broussard, LA (US)

(73) Assignee: PetroTechnologies, Inc., Broussard, LA (US)

( * ) Notice: Subject to any disclaimer, the term of this patent is extended or adjusted under 35 U.S.C. 154(b) by 457 days.

(21) Appl. No.: 12/432,673

(22) Filed: Apr. 29, 2009

(65) Prior Publication Data

US 2010/0280769 A1    Nov. 4, 2010

(51) Int. Cl.
*G06F 17/00* (2006.01)
(52) U.S. Cl. ........................................................ 702/51
(58) Field of Classification Search .............. 702/51–55, 702/9, 14–16, 182–185, 188
See application file for complete search history.

(56) References Cited

U.S. PATENT DOCUMENTS

| | | | |
|---|---|---|---|
| 4,517,828 A | 5/1985 | Miller et al. | |
| 5,201,212 A | 4/1993 | Williams | |
| 5,526,679 A | 6/1996 | Filippi et al. | |
| 5,586,050 A | 12/1996 | Makel et al. | |
| 5,883,815 A | 3/1999 | Drakulich et al. | |
| 6,101,452 A | 8/2000 | Krall et al. | |
| 2004/0098212 A1 | 5/2004 | Hong et al. | |
| 2006/0058847 A1 | 3/2006 | Lenz et al. | |
| 2006/0070423 A1 | 4/2006 | Hoffmann et al. | |
| 2009/0322544 A1* | 12/2009 | McDowell | 340/605 |

* cited by examiner

*Primary Examiner* — Edward Raymond
(74) *Attorney, Agent, or Firm* — Buskop Law Group, PC; Wendy Buskop

(57) ABSTRACT

A method for evaluating the leak tightness of a connector, or multiple connectors. The method uses an administrative server having a library of pressure and temperature information on various connectors, as well as the ability to report pressure and temperature data to a network as uncorrected and corrected responses. The method uses a data logger for recording pressure and temperature readings and also reporting corrected and uncorrected responses using one or more equations to shorten the test time by at least 50 percent or to about 5 minutes or less. The method uses a test pump for applying pressure to a connector to generate a corrected pressure which indicates leaks when the corrected pressure changes.

21 Claims, 8 Drawing Sheets

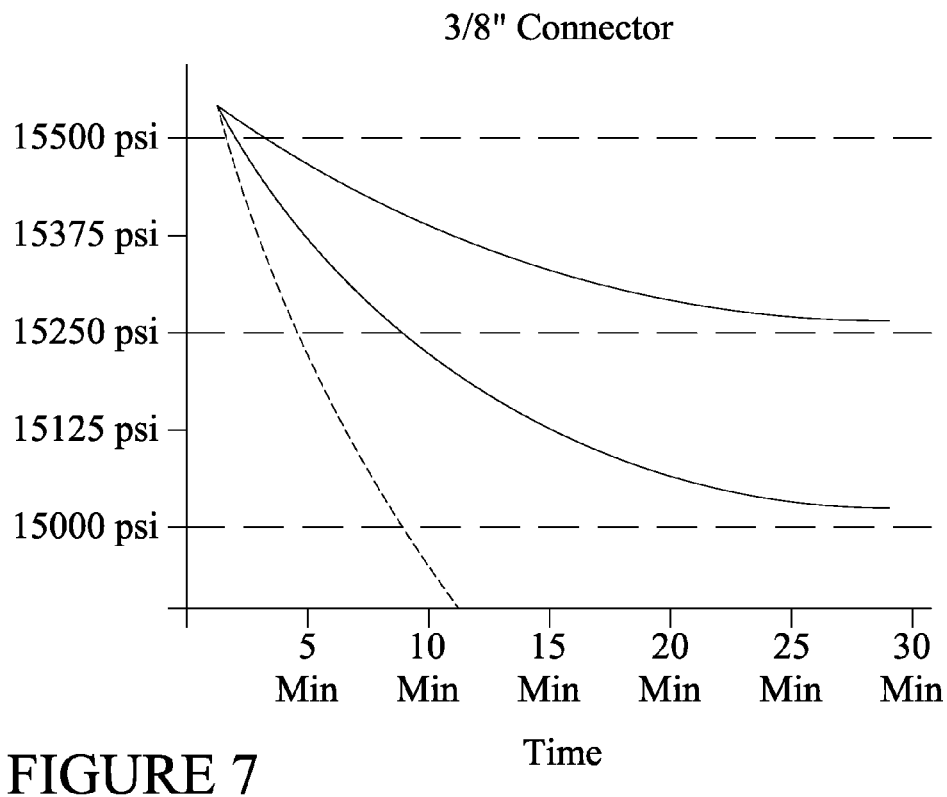
FIGURE 7
FIGURE 8
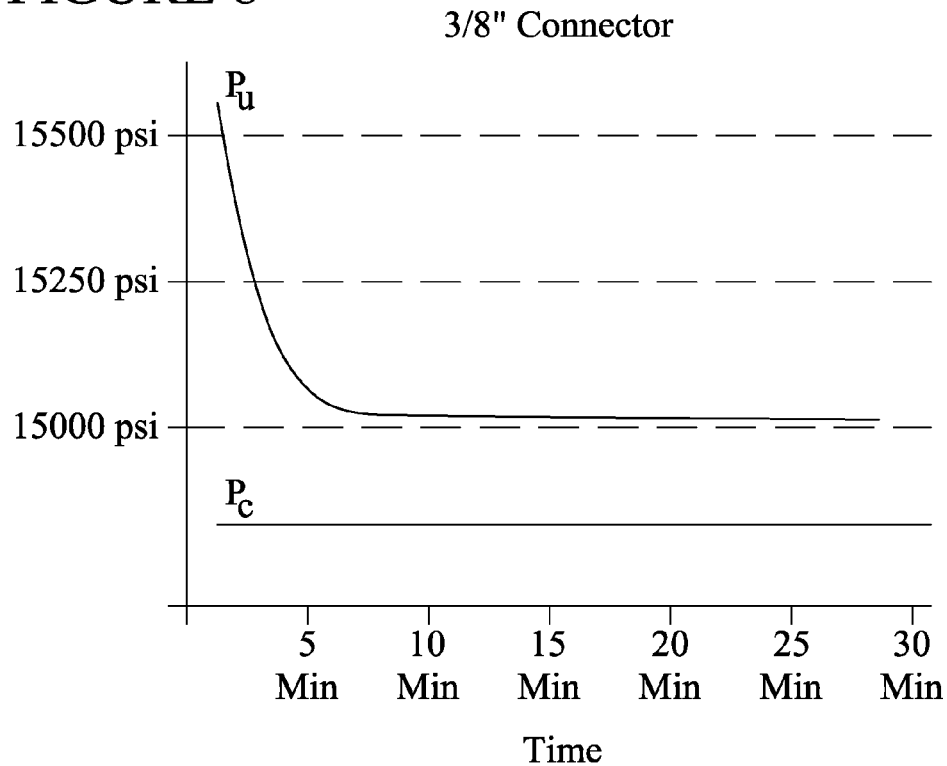

METHOD TO DETERMINE CONNECTOR LEAKS DURING TESTING

FIELD

The present embodiments generally relate to a method for determining integrity between a connector and a conduit.

BACKGROUND

A need exists for an external test method for a connector that allows pressurization external of a conduit prior to inserting the conduit with a connector down a well, or into deep water. A method is needed that allows for testing of the conduit to determine integrity between the connector and the conduit in a short time window of 5 minutes or less.

A further need exists for a testing method that is twice as fast as currently commercially available testing methods.

The present embodiments meet these needs.

BRIEF DESCRIPTION OF THE DRAWINGS

The detailed description will be better understood in conjunction with the accompanying drawings as follows:

FIG. 7 is a graphical representation of an uncorrected response curve.

FIG. 8 illustrates a graphical representation of a corrected response curve.

Figure 1:
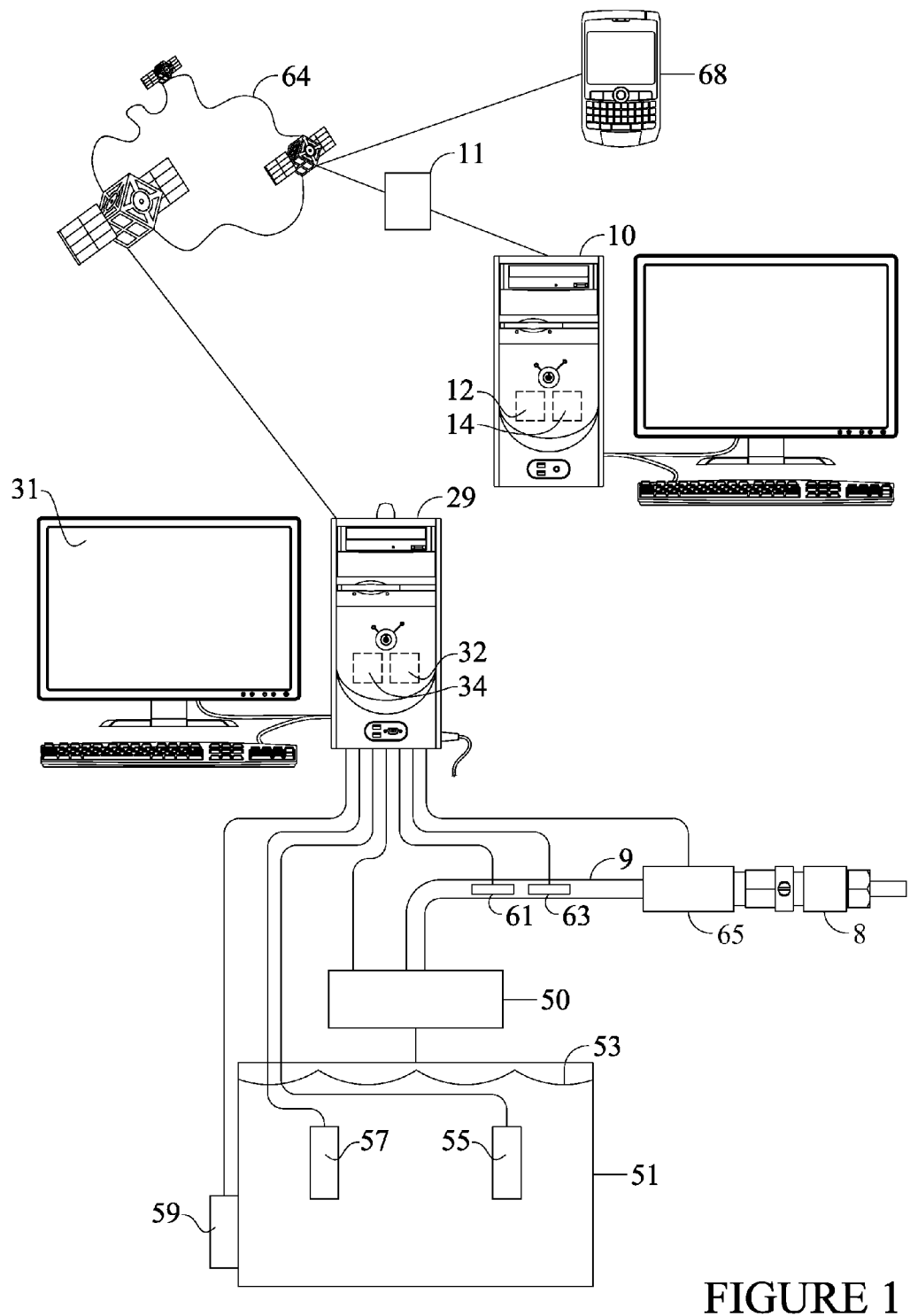
FIG. 1 is a schematic of elements for determining leak tightness of a connector usable in the method.

The present embodiments are detailed below with reference to the listed Figures.

DETAILED DESCRIPTION OF THE EMBODIMENTS

Before explaining the present method in detail, it is to be understood that the method is not limited to the particular embodiments and that it can be practiced or carried out in various ways.

The present embodiments relate to a method for evaluating leak tightness of at least one connector for control conduits, such as umbilicals, usable with field completions, such as oil well completions, well drilling, such as water well drilling, or oil or natural gas drilling, or combinations thereof.

The present embodiments further relate to a method for evaluating leak tightness for connections used in the aerospace industry, such as between a fuel line and a fuselage.

The embodiments of the method can use an administrative server which can have an administrative processor, such as an Intel Pentium processor, and administrative data storage, such as 1 gigabyte data storage.

The administrative data storage can include a library of pressure and temperature information on connectors. This library of pressure and temperature information can be stored in a dynamic information database in the administrative data storage.

The library of pressure and temperature information can have data for a plurality of connectors. The library can also include equations for producing corrected pressures for a variety of connectors and forming pressure decay rates, having defined pressures relative to defined temperatures. For example, the library can contain for a ¼ inch diameter connector, pressure information in the form of an equation relative to a defined temperature, such as 70 degrees Fahrenheit.

The administrative data storage can include computer instructions for producing a report of recorded pressures and temperatures and corrected pressures and pressure decay rates. The pressures and temperatures can be recorded from sensors, which can be in communication with the data logger. The pressure sensor can be located in the test fluid and the temperature sensor can be located proximate the connector. In an embodiment, a thermocouple can be located in or on the side of a reservoir of test fluid used in the testing process associated with this method.

As used herein the term "recorded pressure signals" can refer to pressure in psi coming from an electronic pressure transducer or "first pressure sensor", which can be located in the test fluid. The recorded pressure can be determined from the transducer in the reservoir of the test fluid and from a "second pressure sensor" in a conduit communicating between a test pump and a connector.

The term "recorded temperature signals" can refer to the temperatures indicated by a "first temperature sensor", which can be located on a connector, a "second temperature sensor", which can be located on the conduit communicating between a test pump and a connector, and/or a thermocouple on the side of the reservoir of a test fluid, or a "third temperature sensor" in the test fluid of the reservoir of a test fluid.

The term "corrected pressure" can refer to the adjustment of the uncorrected pressure with respect to a predicted response computed from the recorded temperatures and pressures using the equations to produce the pressure decay rate for the connector.

The term "pressure decay rate" can refer to the curve created using the equations in the library of pressure and temperature information on connectors using defined temperatures and defined pressures for each connector.

The administrative data storage can further include computer instructions to transmit any created report of the recorded pressures and recorded temperatures to another device, such as the administrative server, a client device or a data logger. The computer instructions to transmit the report can include computer instructions to transmit the report over at least one network.

The network can be a satellite network, the internet, a wireless network, a fiber optic network, a LAN, or combinations thereof.

The data logger usable in this method can have a housing with a display, which can be a touch screen display, or in another embodiment, an explosion proof display.

In the housing of the data logger, can be a data logger processor, which can be in communication with the display and with data logger data storage.

Data logger data storage can be used to store at least one equation from the library that produces, at a site in the field, a pressure decay rate for connectors secured to at least one control conduit at a defined pressure over time for defined temperature.

For example, a data logger can produce a decay rate for a ½ inch connector secured to a tubing hanger at a pressure of about 15,000 psi over a 20 minute time interval at a temperature of about 80 degrees Fahrenheit.

The data logger data storage can include computer instructions for instructing the data logger processor to record pressure readings from connectors, and to record temperature readings from the same connectors.

The data logger data storage can include computer instructions for generating a report of a uncorrected response using the recorded pressure readings and recorded temperatures readings. Additionally, the data logger data storage can have computer instructions for instructing the data logger processor to generate a corrected response using the recorded pressure readings, recorded temperature readings and the at least one equation.

The data logger can also have at least one USB port, an on-board power supply, which can be rechargeable, and a parallel port for connecting the data logger to a printer or similar device. The data logger can also have a bus that can connect to both a temperature sensor and a pressure sensor.

The housing of the data logger can be explosion proof, water tight and leak proof.

The method can include a test pump adapted to produce pressures of at least 10,000 psi in communication with a fluid source, which can be a reservoir of test fluid. The test pump can be in communication with the data logger for securing to one or more of the connectors for generating pressures at each connector.

The test pump can be fluidly attached to each of the connectors, and then a test pressure exceeding a desired corrected response pressure is applied with the test pump to the connector.

The term "desired corrected response pressure" can be defined herein to mean the expected pressure at the end of at least a 20 minute lengthy pressure test.

Once the pressure is applied, the test pump can be isolated, and then pressure and temperature readings can be recorded into the data logger data storage. Simultaneously with the recording, the pressure and temperate readings can be presented on the display of the data logger.

Next, the recorded pressure and temperature readings can be processed by the data logger processor using at least one equation to produce a corrected pressure which can be displayed as a corrected response curve.

The following Table 1 shows equations to produce corrected pressures for connectors:

---

¼" POTH Connector, Part # 130M581 Rev.
C, size = ¼", Pressure = −175 * log (time
in seconds) 21,500;
⅜" POTH Connector, Part # 130M591 Rev.
D, size = ⅜", Pressure = −170 * log
(time in seconds) + 21,500; and
½" POTH Connector, Part # 130M891 Rev.
B, size = ½", Pressure = −165 * log (time
in seconds) + 21,500.

---

When corrected pressure is displayed on the data logger display, it can be viewed by an operator. When the corrected pressure changes from a preset limit, an alarm can be provided indicating a leak between the connector and the control conduit.

The alarm can be an indication on the display that a leak exists between the connector and the control conduit.

The alarm can be an audio alarm, a flashing light, an icon on the display, an email transmitted to a cellular phone, such as an I-Phone™ of a system user, or similar alarm notification device.

The alarm can include computer instructions in the data logger data storage to determine the rate of leak indicated by the alarm. For example, the rate of leak can be about 0.01 ml per minute for a rapid flashing strobe alarm.

The administrative server usable in this method can be a personal computer, a laptop or another computing device with a processor and data storage capable of communication with at least one network.

In this method, a webserver can be located between a network and the administrative server for providing easy log in and simultaneously firewall protection to the system for users with client devices in communication through a network.

The connectors can engage control conduits that can comprise steel tubulars, high nickel alloy tubulars, other metal tubulars that hold control umbilical, cables, fuel lines, and fiber optics.

The connectors can be about ⅛ inch diameter connectors, or have diameters that vary from about 2 inches to about ¼ inch, for connecting between the control conduit and a fluid source.

The data logger data storage can include computer instructions for instructing the data logger to transmit the report to the administrative server, to a client device or combinations of these devices.

The library of pressure information on connectors usable in this method can include: sizes of connectors, responses from each connector to pressures between about 10,000 psi to about 20,000 psi at a plurality of identified temperatures; pressure decay rates over time for each connector for each identified temperature; and equations that produce the pressure decay rates for each connector at a defined pressure over time for temperatures between a first and second identified temperature.

The term "identified temperatures" can refer to a first, a second, or both temperatures at which the pressure data was recorded to create the equations.

An example of a "defined pressure over time for temperatures between a first and second identified temperature" can be a ¼ inch tested connected tested at 10,000 psi between 80 degrees Fahrenheit to 82 degrees Fahrenheit.

Each equation in the method can be specific to each connector.

In the method, the data storage of the administrative server can have an administrative dynamic information database that can include one or more of the following elements: a customer name, such as "David Levy", a customer address, a customer email and a customer phone, a unique customer identifier; such as client number 1237, a plurality of connector assembly numbers, such as 130M591 revision D, connector sizes such as ¾ inch diameter connectors for methanol injection, connector materials, such as the connector is made of alloy 925 which is a steel, customer payment information such as VISA™ or MasterCard™ numbers, well names such as Shell Tahoe, well locations, such as Green Canyon Block Number 150 rig names, such as Bullwinkle™ in the Gulf of Mexico, operator names, date and time of testing; such as Apr. 21, 2009 at 1:31 pm, purchase order number, and combinations of these and other elements useful to the customer relationship can be included in the data storage of the administrative server, such as date of next well completion.

In this method the administrative server can communicate with at least one client device for receiving a report and monitoring the pressures and corrected responses. The client device usable in this method can have a processor with data storage and computer instructions in the data storage to present an executive dashboard for continuous monitoring of the corrected responses and testing of the connectors by well technician, operator or some other selected variable.

The executive dashboard usable in this method can also include the following elements: time, date, location of well, location of test, customer name, well name and similar information.

Turning now to the Figures, FIG. 1 is a schematic overview of an administrative server (10), a data logger (29), a test pump (50), and a reservoir of test fluid (51).

FIG. 1 further shows the administrative server (10), which can contain administrative processor (12) and administrative data storage (14). Also shown is the data logger (29), which can have a data logger processor (32), a data logger data storage (34), and a display (31). A test pump (50) can connect to the data logger (29) to transmit the pressure and temperature signals between the apparatus. A webserver (11) is shown in communication with a network (64), such as the internet, and the administrative server (10) for providing easy log in and simultaneously firewall protection to the system for users with client devices in communication through the network (64). A client device (68) can also be in communication with the network (64).

The test pump (50) can further be in communication with a connector (8) through a control conduit (9). Proximate the connector (8) can be a first temperature sensor (65). Within the control conduit (9) can be a second pressure sensor (61) and a second temperature sensor (63).

Still referring to FIG. 1, the reservoir of test fluid (51) can comprise a test fluid (53). Within the test fluid (53) can be a first pressure sensor (55) and a third temperature sensor (57). Proximate the reservoir of reservoir of test fluid (51) can be a thermocouple (59).

Figure 2:
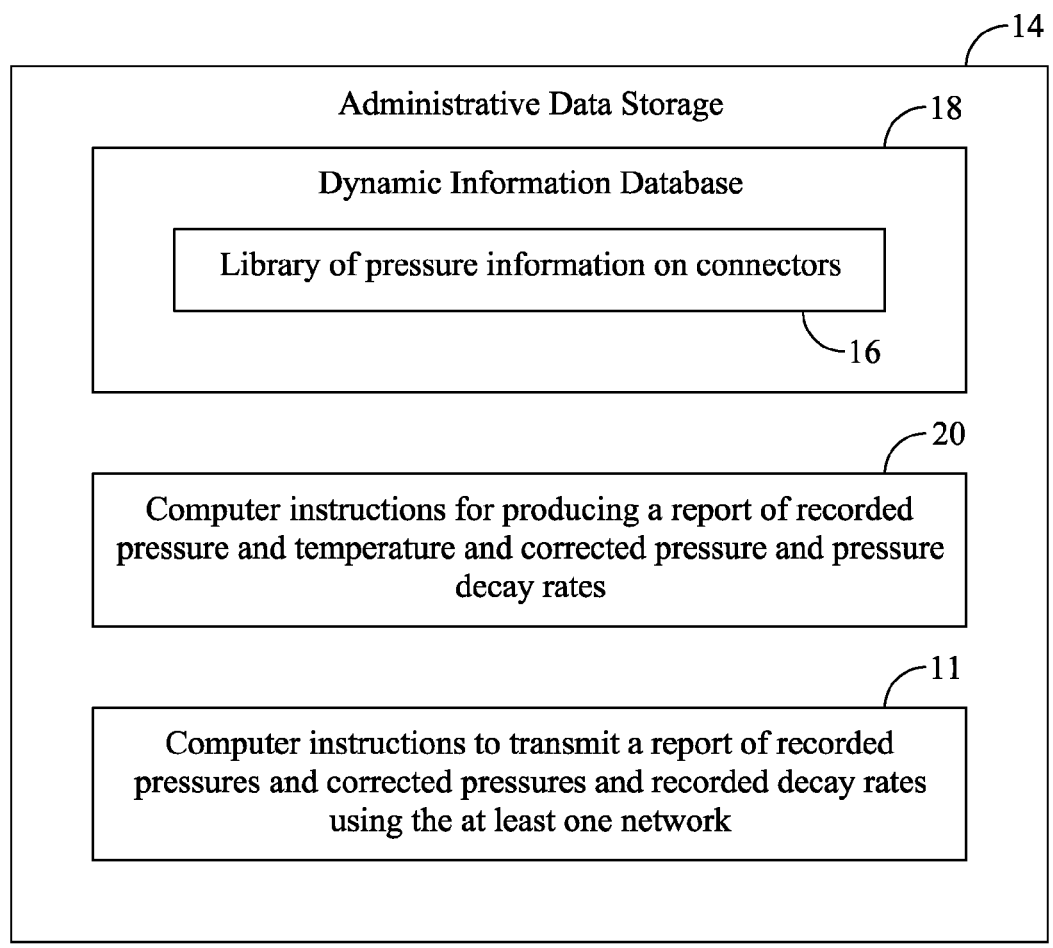
FIG. 2 illustrates a schematic representation of an administrative data storage usable in the method.

FIG. 2 shows the administrative data storage (14), which can be usable in the method with a library of pressure information on connectors (16) in an administrative dynamic information database (18).

Additional computer instructions for producing a report of recorded pressure and temperature and corrected pressure and pressure decay rates (20) are shown. The administrative data storage shows computer instructions to transmit a report of recorded pressures and corrected pressures and recorded decay rates (11) using the at least one network.

Figure 3:
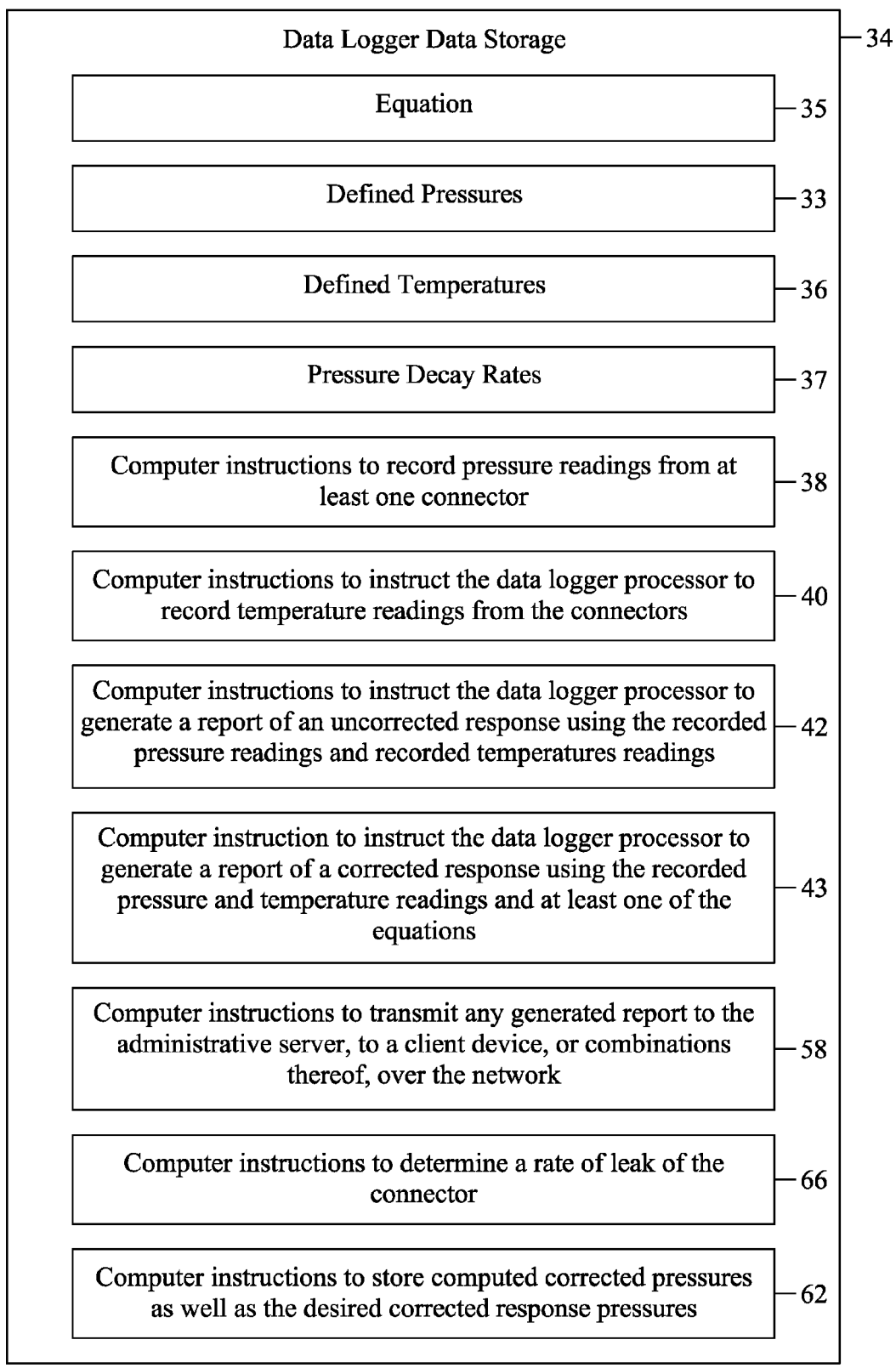
FIG. 3 illustrates a schematic representation of data storage of a data logger usable in the method.

FIG. 3 shows a detail of data logger data storage (34), which can store at least one equation (35), defined pressures (33), defined temperatures (36) and pressure decay rates (37). Data logger data storage (34) can further have computer instructions to record pressure readings (38) from at least one connector, and computer instructions to instruct the data logger processor to record temperature readings from the connector (40), and computer instructions to instruct the data logger processor to generate a report of an uncorrected response using the recorded pressure readings and recorded temperatures readings (42), and computer instruction to instruct the data logger processor to generate a report of a corrected response using the recorded pressure and temperature readings and at least one of the equations (43).

The data logger can also have computer instructions to transmit any generated report to the administrative server, to a client device, or combinations thereof, over the network (58).

The data logger can also have computer instructions to determine a rate of leak of the connector (66). The data logger can further have computer instructions to store computed corrected pressures as well as the desired corrected response pressures (62).

Figure 4:
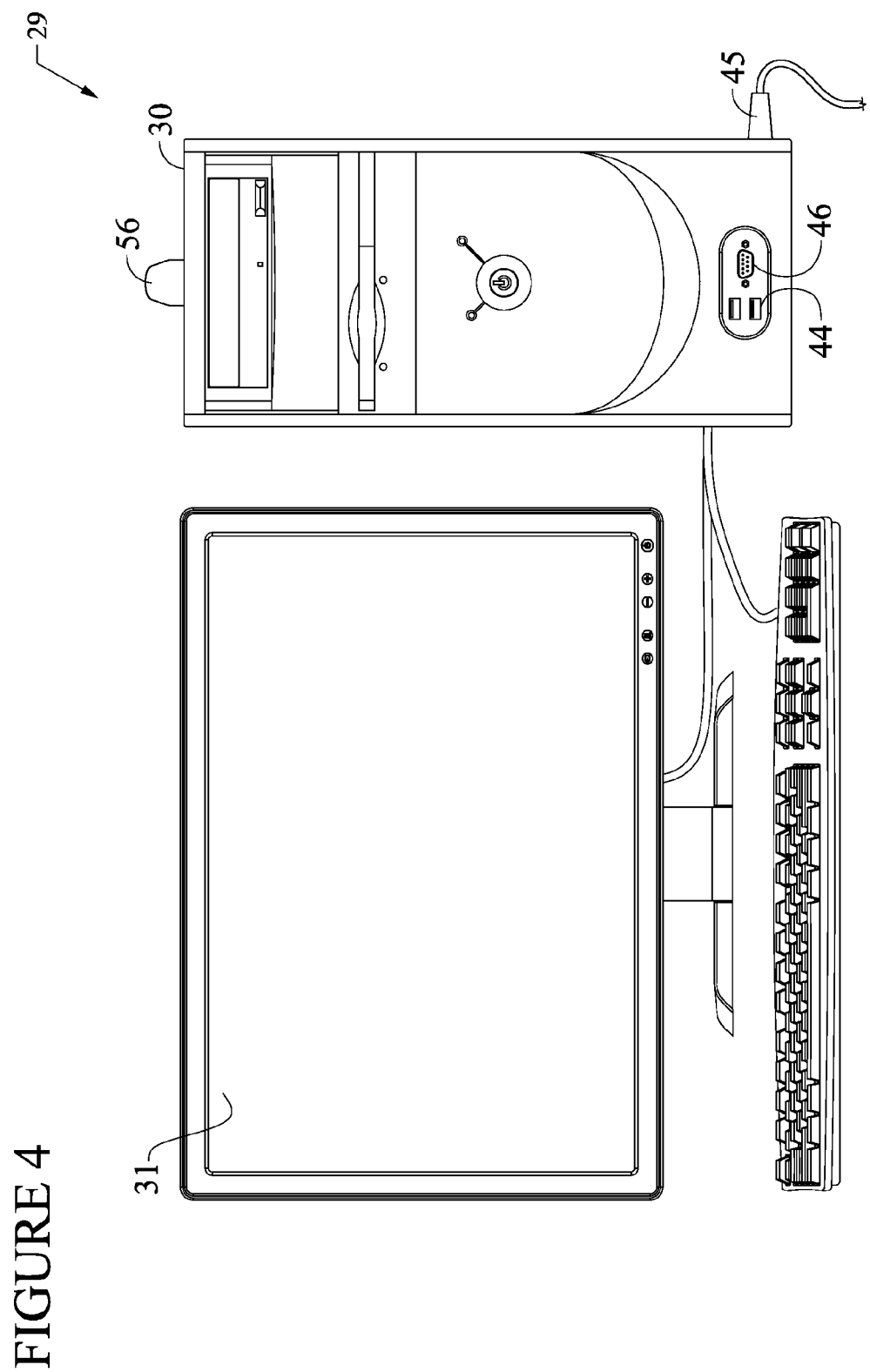
FIG. 4 illustrates perspective view of a data logger usable in the method.

FIG. 4 shows a perspective view of a data logger (29). The data logger (29) can have a housing (30) with a display (31), a USB port (44), a power supply (45), and a parallel port (46). An alarm (56) is shown and can be secured to the data logger (29). In an embodiment, the alarm can be a light.

Figure 5:
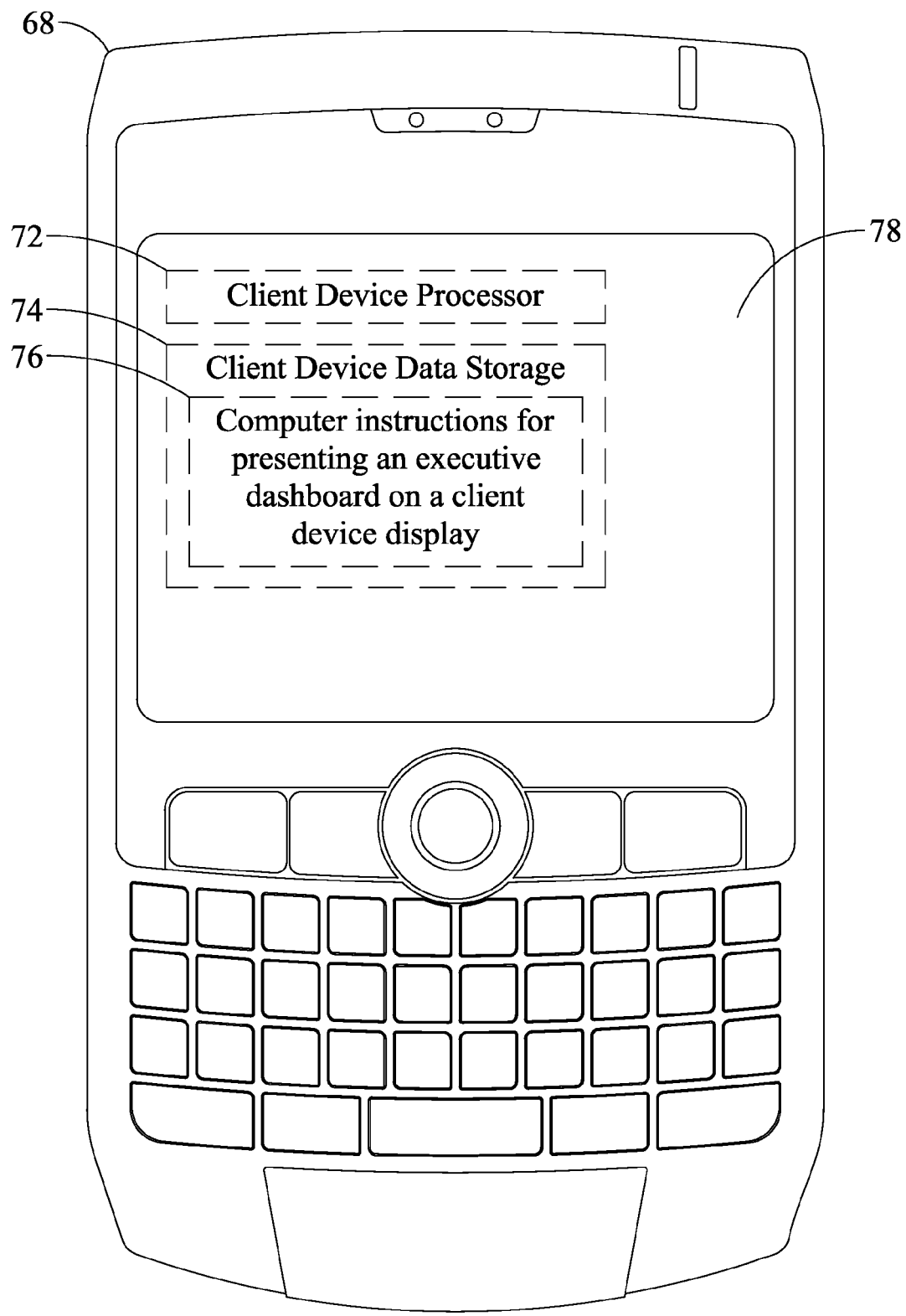
FIG. 5 is a schematic of a client device usable with the method.

FIG. 5 shows client device (68), which can be usable in the method. The client device (68) can have a client device processor (72), client device data storage (74) and computer instructions in the client device for presenting and executive dashboard on a client device display (76). The client device display (78) can present the executive dashboard for viewing the testing conditions and test results from a data logger, or a plurality of data loggers simultaneously connected to connectors.

Figure 6:
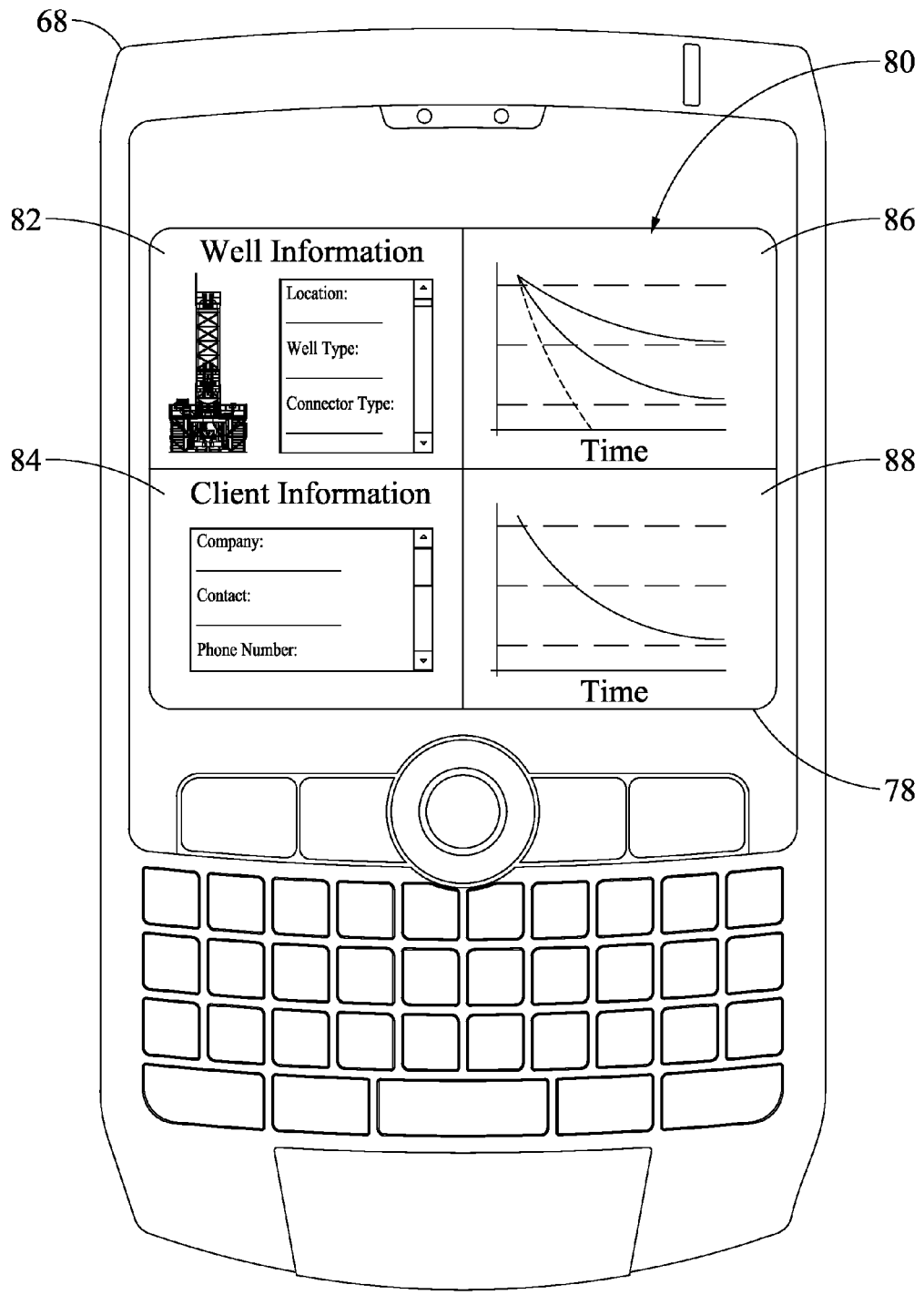
FIG. 6 illustrates an executive dashboard usable in the method.

FIG. 6 shows an executive dashboard (80), which can be usable in the method. The executive dashboard (80) can display well information (82), client information (84), an uncorrected response as a curve (86) and a corrected response as a curve (88). The executive dashboard (80) can be displayed on the client device display (78) of the client device (68).

FIG. 7 is a graphical representation, producible in this method, of an uncorrected response as a curve for a ⅜ inch connector that has been test pressurized to about 15,500 psi over a time of about 30 minutes. A first curve shows a pressure decay rate without a leak at a temperature of about 80 degrees Fahrenheit. A second curve shows a pressure decay rate without a leak at a temperature of about 70 degrees Fahrenheit. The third curve shows a leak at a rate of about 1 cc per minute at about 70 degrees Fahrenheit. The leak is different from the other curves at 5 minutes for fast viewing.

FIG. 8 illustrates a graphical representation, producible in this method, of a corrected response as a curve over about 30 minutes. The representation starts at Pu=pressure uncorrected is at about 15,500 psi and it moves to Pc=pressure corrected of about 15,000 psi revealing the testing need not take 30 minutes, and the answer can be available at 5 minutes.

Figure 9:
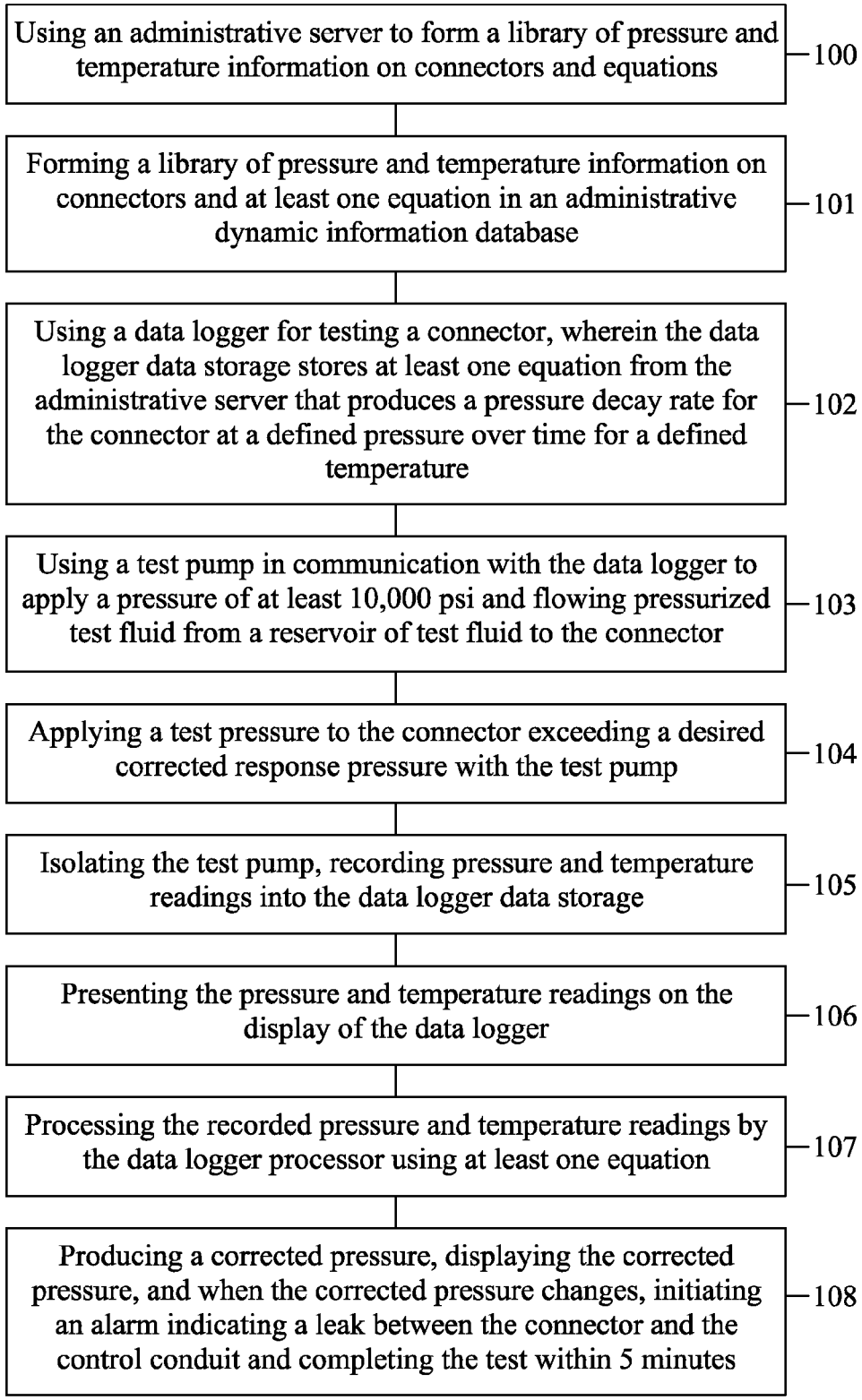
FIG. 9 is a flow diagram showing steps of the method.

FIG. 9 is a flow diagram showing steps of the method. The method can comprises the step of using an administrative server to form a library of pressure and temperature information on connectors and equations (100). The method can continue with the step of forming a library of pressure and temperature information on connectors and at least one equation in an administrative dynamic information database (101). The method can continue with using a data logger for testing a connector, wherein the data logger data storage stores at least one equation from the administrative server that produces a pressure decay rate for the connector at a defined pressure over time for a defined temperature (102).

The method can also have the steps of using a test pump in communication with the data logger to apply a pressure of at least 10,000 psi and flowing pressurized test fluid from a reservoir of test fluid to the connector (103); applying a test pressure to the connector exceeding a desired corrected response pressure with the test pump, isolating the test pump (104); isolating the test pump, recording pressure and temperature readings into the data logger data storage (105); presenting the pressure and temperature readings on a display of the data logger (106); and processing the recorded pressure and temperature reading by the data logger processor using at least one equations (107).

The method can also comprise the step of producing a corrected pressure, displaying the corrected pressure, and when the corrected pressure changes, initiating an alarm indicating a leak between the connector and the control conduit and completing the test within 5 minutes (108).

While these embodiments have been described with emphasis on the embodiments, it should be understood that within the scope of the appended claims, the embodiments might be practiced other than as specifically described herein.

What is claimed is:

1. A method for evaluating leak tightness of at least one connector for control conduits usable with field completions, well drilling, or combinations thereof, comprising:
   a. using an administrative server comprising an administrative processor and administrative data storage to form a library of pressure and temperature information on connectors and equations, in an administrative dynamic information database, computer instructions for producing a report of recorded pressures and temperatures and corrected pressures and pressure decay rates, and computer instructions to transmit the report of recorded pressures and corrected pressures and computed pressure decay rates using at least one network;
   b. forming a library of pressure and temperature information on connectors and at least one equation in an administrative dynamic information database in an administrative data storage of an administrative server further comprising an administrative processor;
   c. using a data logger for testing a connector, wherein the data logger is in communication with the administrative server, wherein the data logger comprises a data logger housing for supporting a display, wherein the display is connected to a data logger processor with data logger data storage, at least one USB port, a power supply, and a parallel port; and wherein the data logger data storage stores at least one equation from the administrative server that produces a pressure decay rate for the connector at a defined pressure over time for a defined temperature, and wherein the data logger data storage further comprises computer instructions for:
      (i) instructing the data logger processor to record pressure readings from the connector;
      (ii) instructing the data logger processor to record temperature readings from the connector;
      (iii) instructing the data logger processor to generate a report of an uncorrected response using the recorded pressure readings and recorded temperatures readings; and
      (iv) instructing the data logger processor to generate a report of a corrected response using the recorded pressure and temperature readings and the equation;
   d. using a test pump in communication with the data logger to apply a pressure of at least 10,000 psi and flowing pressurized test fluid from a reservoir of test fluid to the connector; and, applying a test pressure to the connector exceeding a desired corrected response pressure with the test pump, isolating the test pump, recording pressure and temperature readings into the data logger data storage, presenting the pressure and temperature readings on the display of the data logger, processing the recorded pressure and temperature readings by the data logger processor using at least one equation and producing a corrected pressure, displaying the corrected pressure, and when the corrected pressure changes, initiating an alarm indicating a leak between the connector and the control conduit and completing the test within 5 minutes.

2. The method of claim 1, wherein the administrative server is a personal computer, a laptop, or another computing device with a processor and data storage capable of communication with at least one network.

3. The method of claim 1, wherein the alarm provides an icon on the display that indicates a leak exists between the connector and the control conduit.

4. The method of claim 1, wherein the data logger data storage further comprises computer instructions to determine the rate of a leak.

5. The method of claim 1, wherein the control conduit comprises steel tubulars, high nickel alloy tubulars, other metal tubulars for carrying control umbilical, cables, or fiber optics.

6. The method of claim 1, wherein the connectors comprise diameters between ¼ inch to 2 inches and are adapted for connecting between the control conduit and a fluid source.

7. The method of claim 1, wherein the data logger has computer instructions to store computed corrected pressures as well as the desired corrected response pressures.

8. The method of claim 1, wherein the data logger has computer instructions for producing a report of recorded pressure and temperature and corrected pressure and pressure decay rates.

9. The method of claim 1, wherein the data logger has computer instructions to transmit a report of recorded pressures and corrected pressures and recorded decay rates using the at least one network.

10. The method of claim 1, further comprises a webserver in communication with the at least one network and the administrative server.

11. The method of claim 1, wherein the at least one network is a satellite network, the internet, a wireless network, fiber optic, a LAN, or combinations thereof.

12. The method of claim 1, wherein the library of pressure and temperature information on connectors comprises:
   a. size information for a plurality of connectors;
   b. responses for a plurality of connectors between 10000 psi to 20,000 psi at a plurality of identified temperatures;
   c. pressure decay rates over time for a plurality of connectors with at least one identified temperature; and
   d. at least one equation that produces a pressure decay rate for at least one connector at a defined pressure over time for temperatures between a first and second identified temperature.

13. The method of claim 12, wherein each of the at least one equations is unique to each type of connector.

14. The method of claim 1, wherein the administrative data storage further comprises in the dynamic information database, at least one member selected from the group consisting of:
   a. customer name, address, email and phone;
   b. a customer identifier;
   c. a connector number;
   d. a connector size;
   e. a connector material;
   f. customer payment information;
   g. a well name;
   h. a well location;
   i. a rig name;
   j. an operator name;
   k. a date of testing;
   l. a time of testing;
   m. a purchase order number; and
   n. combinations thereof.

15. The method of claim 1, further comprises at least one temperature sensor located within the test fluid, or within the control conduit, or proximate the connector, or combination thereof and is in communication with the data logger.

16. The method of claim 1, further comprises at least one pressure sensor located within the test fluid, or within the control conduit, or combinations thereof and is in communication with the data logger.

17. The method of claim 1, wherein a thermocouple is located proximate the reservoir of the test fluid and is in communication with the data logger.

18. The method of claim 1, further comprises a client device in communication with the administrative server for receiving a report and monitoring testing.

19. The method of claim 18, wherein the client device further comprises a client device processor and a client device data storage, wherein the client device data storage comprises computer instructions to instruct the client device processor to present an executive dashboard on a display of the client device for continuous monitoring of the testing of the connectors.

20. The method of claim 1, further comprises computer instructions in the data logger data storage for instructing the data logger processor to transmit the report to the administrative server, a client device, or combinations thereof.

21. The method of claim 19, wherein the executive dashboard displays at least one member of the following group:
 a. well information;
 b. client information;
 c. uncorrected response curves;
 d. corrected responses; and
 e. combination thereof.

* * * * *